(12) United States Patent
Akirav et al.

(10) Patent No.: US 9,507,671 B2
(45) Date of Patent: Nov. 29, 2016

(54) WRITE CACHE PROTECTION IN A PURPOSE BUILT BACKUP APPLIANCE

(71) Applicant: GLOBALFOUNDRIES INC., Grand Cayman, KY (US)

(72) Inventors: Shay H. Akirav, Petach-Tikva (IL); Joseph W. Dain, Vail, AZ (US); Stefan Lehmann, Tucson, AZ (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 124 days.

(21) Appl. No.: 14/028,149

(22) Filed: Sep. 16, 2013

(65) Prior Publication Data

US 2015/0082081 A1 Mar. 19, 2015

(51) Int. Cl.
| | |
|---|---|
| *G06F 11/00* | (2006.01) |
| *G06F 11/14* | (2006.01) |
| *G06F 11/16* | (2006.01) |
| *G06F 11/10* | (2006.01) |

(52) U.S. Cl.
CPC ....... *G06F 11/1469* (2013.01); *G06F 11/1612* (2013.01); *G06F 11/1076* (2013.01); *G06F 2211/1009* (2013.01)

(58) Field of Classification Search
CPC ........ G06F 11/1446–11/1469; G06F 11/1612; G06F 2211/10–2211/1095; G06F 11/1076–11/1096; G06F 11/1658–11/1662; G06F 11/2097; G06F 2211/1009
See application file for complete search history.

(56) References Cited

U.S. PATENT DOCUMENTS

| | | | |
|---|---|---|---|
| 6,243,795 B1* | 6/2001 | Yang | G06F 11/1666 160/113 |
| 8,024,525 B2 | 9/2011 | Willis et al. | |
| 2004/0117580 A1* | 6/2004 | Wu et al. | 711/170 |
| 2006/0161707 A1* | 7/2006 | Davies et al. | 710/268 |
| 2007/0101186 A1* | 5/2007 | Chen | 714/6 |
| 2008/0082856 A1* | 4/2008 | French | G06F 11/2089 714/2 |
| 2010/0106904 A1 | 4/2010 | Berke et al. | |

FOREIGN PATENT DOCUMENTS

WO WO 2008121573 A1 * 10/2008 .......... G06F 11/2092

* cited by examiner

*Primary Examiner* — Jason Bryan
(74) *Attorney, Agent, or Firm* — Yuanmin Cai, Esq.

(57) ABSTRACT

For write cache protection of purpose built backup appliances in a computing environment, backup data of the write cache is created using a server memory that includes the write cache in a redundant array of independent disks (RAID) system. The server memory is not controlled by a failing RAID card and/or NVRAM card that controls the write cache. The backup data in the server memory is flushed to a persistent storage device subsequent to detecting a failure of the write cache for enabling recovery of the backup data using the persistent storage device during a reboot operation.

20 Claims, 6 Drawing Sheets

WRITE CACHE PROTECTION IN A PURPOSE BUILT BACKUP APPLIANCE

BACKGROUND OF THE INVENTION

Field of the Invention

The present invention relates in general to computers, and more particularly to write cache protection of purpose built backup appliances in a computing environment.

Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. An efficient way to alleviate the problem is by using purpose built backup appliances that contain advanced function such as data deduplication. The idea of a purpose built backup appliance containing advanced capability such as data deduplication is to exploit the fact that large parts of available data are copied, again and again, by locating repeated data and storing only its first occurrence. Subsequent copies are replaced with pointers to the stored occurrence, which significantly reduces the storage requirements if the data is indeed repetitive. However, a significant need exists for minimizing the hardware footprint in a computing network during deduplication, for example, along with providing enterprise class high availability and load balancing for systems with redundancy.

SUMMARY OF THE DESCRIBED EMBODIMENTS

In one embodiment, a method is provided for write cache protection of purpose built backup appliances using at least one processor device in a computing environment. In one embodiment, by way of example only, backup data of the write cache is created using a server memory that includes the write cache in a redundant array of independent disks (RAID) system. The server memory is not controlled by a failing RAID card and/or NVRAM card that controls the write cache. The backup data in the server memory is flushed to a persistent storage device subsequent to detecting a failure of the write cache for enabling recovery of the backup data using the persistent storage device during a reboot operation.

In another embodiment, a computer system is provided for write cache protection of purpose built backup appliances using at least one processor device, in a computing environment. The computer system includes a computer-readable medium and a processor in operable communication with the computer-readable medium. In one embodiment, by way of example only, at least one of the processor devices creates backup data of the write cache using a server memory that includes the write cache in a redundant array of independent disks (RAID) system. The server memory is not controlled by a failing RAID card and/or NVRAM card that controls the write cache. The backup data in the server memory is flushed to a persistent storage device subsequent to detecting a failure of the write cache for enabling recovery of the backup data using the persistent storage device during a reboot operation.

In a further embodiment, a computer program product is provided for write cache protection of purpose built backup appliances in a deduplication system using at least one processor device, in a computing environment. The computer-readable storage medium has computer-readable program code portions stored thereon. The computer-readable program code portions include a first executable portion that creates backup data of the write cache using a server memory that includes the write cache in a redundant array of independent disks (RAID) system. The server memory is not controlled by a failing RAID card and/or NVRAM card that controls the write cache. The backup data in the server memory is flushed to a persistent storage device subsequent to detecting a failure of the write cache for enabling recovery of the backup data using the persistent storage device during a reboot operation.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Purpose built backup appliances often contain support for data deduplication. IDC defines a purpose-built backup appliance (PBBA) as a standalone disk-based solution that utilizes software, disk arrays, server engine(s), or nodes that are used for a target for backup data and specifically data coming from a backup application or can be tightly integrated with the backup software to catalog, index, schedule, and perform data movement. The PBBA products are deployed in standalone configurations or as gateways. PBBA solutions deployed in a gateway configuration connect to and store backup data on general-purpose storage. Here, the gateway device is serving as the component that is purpose built solely for backup and not for supporting any other workload or application. Regardless of packaging (as an appliance or gateway), PBBAs can have multiple interfaces or protocols. Also, PBBAs often can provide and receive replication to or from remote sites and a secondary PBBA for the purpose of disaster recovery (DR).

Moreover, data deduplication is a highly important and vibrant field in computing storage systems. Data deduplication refers to the reduction and/or elimination of redundant data. In data deduplication, a data object, which may be a file, a data stream, or some other form of data, is broken down into one or more parts called chunks or blocks. In a data deduplication process, duplicate copies of data are reduced or eliminated, leaving a minimal amount of redundant copies, or a single copy of the data, respectively. The goal of a purpose built backup appliance that provides data deduplication capability is to store a single copy of duplicated data, and the challenges in achieving this goal are efficiently finding the duplicate data patterns in a typically large repository, and storing the data patterns in a storage efficient deduplicated form.

The small to midrange purpose built backup appliance market is extremely competitive in terms of cost, capacity and performance. In order to achieve competitive performance at a competitive cost point, write caching of customer data is performed at the redundant array of independent disks (RAID) level using a single non-volatile random access memory (NVRAM) card or single RAID adapter with integrated RAID cache. However, a significant need exists for write cache protection of purpose built backup appliances using at least one processor device in a computing environment. Thus, to address this need, the present invention provides a solution for write cache protection of purpose built backup appliances. In one embodiment, by way of example only, backup data of the write cache is created using a server memory that includes the write cache in a redundant array of independent disks (RAID) system. The server memory is not controlled by a failing RAID card that controls the write cache. The backup data in the server memory is flushed to a persistent storage device subsequent to detecting a failure of the write cache for enabling recovery of the backup data using the persistent storage device during a reboot operation.

Figure 1:
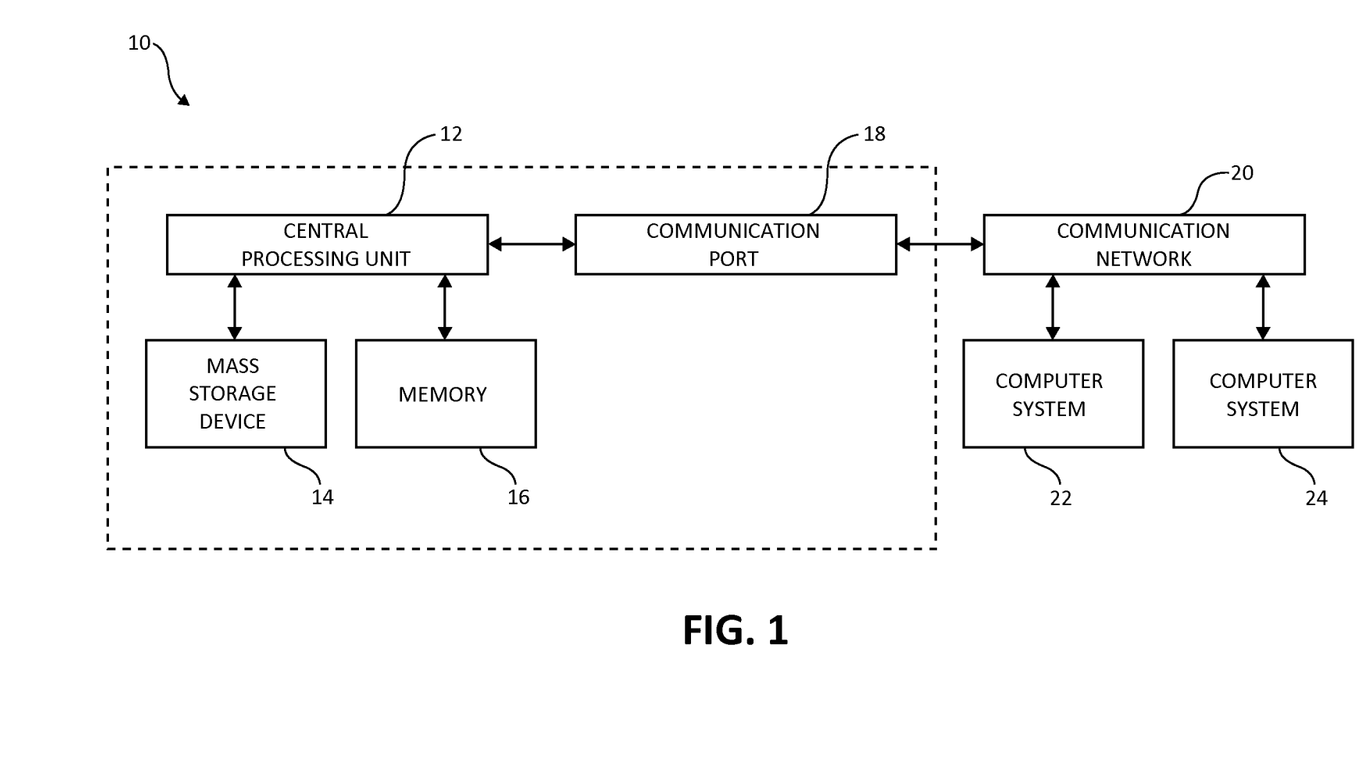
FIG. 1 is a block diagram illustrating a computing system environment having an example storage device in which aspects of the present invention may be realized.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such devices as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

As mentioned above, the small to midrange purpose built backup appliances market is extremely competitive in terms of cost, capacity and performance. In order to achieve competitive performance at a competitive cost point, write caching of customer data is performed at the redundant array of independent disks (RAID) level using a single non-volatile random access memory (NVRAM) card or single RAID adapter with integrated RAID cache. In one embodiment, a battery is provided to provide sufficient charge on the NVRAM/RAID cache content in the event of unexpected power loss for a finite period of time until power is resumed and the cached data can be committed to disk. Alternatively a super capacitor plus (+) flash and/or solid state drive (SSD) device may be used where the capacitor provides enough charge to enable the cached data to be written to persistent flash storage. In one embodiment, internal storage runs the ProtecTIER application code and OS instance. A RAID 1 mirror is created from the internal storage using a PCIe RAID card. A second RAID card containing battery backed dynamic random access memory (DRAM) is used for RAID cache. The second RAID card creates RAID groups and manages additional storage, which holds customer data. One or more CPUs and associated server memory manage the system through a south bridge.

If the NVRAM card or a RAID card itself fails, the data contained in the NVRAM or write cache memory on the RAID card is lost. A RAID card and the RAID card's associated DRAM is used for RAID write cache memory. Since, by definition, in a write cache enabled mode, the RAID stack returns to the calling application that the data has been committed to disk even though it still resides in volatile memory, this results in a data loss scenario. In one embodiment, by way of example only, to solve this problem is to turn off the write cache at the RAID stack but this results in uncompetitive performance to the point where performance is degraded enough to not be a viable product.

In one alternative embodiment, by way of example, an alternative option is to honor application synchronization at the RAID stack level such that whenever an application sends synchronization, the RAID stack flushes the content of the cache to disk. However, one of the challenges with this approach is that typically there will be multiple data streams sending multiple synchronizations to the same underlying storage, which effectively disables write caching as you are always flushing data to disk before the cache is full.

In one alternative embodiment, by way of example, the additional alternative option is to add a second NVRAM card and/or RAID card for redundancy and perform write cache mirroring. In other words, when the data is written to the first NVRAM card or RAID card, the content is also written to a second NVRAM card or RAID card such that if the first NVRAM card or RAID card dies, the content in the write cache can be committed to persistent storage using the alternate device. Such solutions are expensive in terms of cost as adding the extra hardware makes entry-level purpose built backup appliances uncompetitive in terms of cost. In addition, entry-level appliances have limited adapter slots as the solutions are packaged in an integrated server and storage solution from a hardware point of view. This means that there are not enough adapter slots to support redundant NVRAM cards or RAID cards while also providing the required adapters for the deduplication application code to provide the necessary capability to the customer.

Thus, to address these various challenges, the present invention provides a solution for write cache protection of purpose built backup appliances. In one embodiment, by way of example only, the present invention utilizes server memory, which is managed through an operating system to provide a secondary copy of the RAID card/NVRAM write cache content. Upon detecting a failure(s), the present invention dumps the duplicate copy of the write cached data that is preserved in the server memory to local boot drives which are not managed by the same failed RAID card, which ensures a persistent copy of the write cached data. Once the NVRAM card or RAID card is replaced or fixed, procedures are invoked to read the persistent copy of the write cached data from the local boot drives and write it to the original persistent storage to which it was intended. In this way, the present invention provides several advantages to this approach such as 1) minimizes performance impact, 2) eliminates the need for additional hardware, and 3) addresses scenario where the single RAID card or NVRAM card fails.

In one embodiment, by way of example only, backup data of the write cache is created using a server memory that includes the write cache in a redundant array of independent disks (RAID) system. The server memory is not controlled by a failing RAID card that controls the write cache. The backup data in the server memory is flushed to a persistent storage device subsequent to detecting a failure of the write cache for enabling recovery of the backup data using the persistent storage device during a reboot operation.

Figure 2:
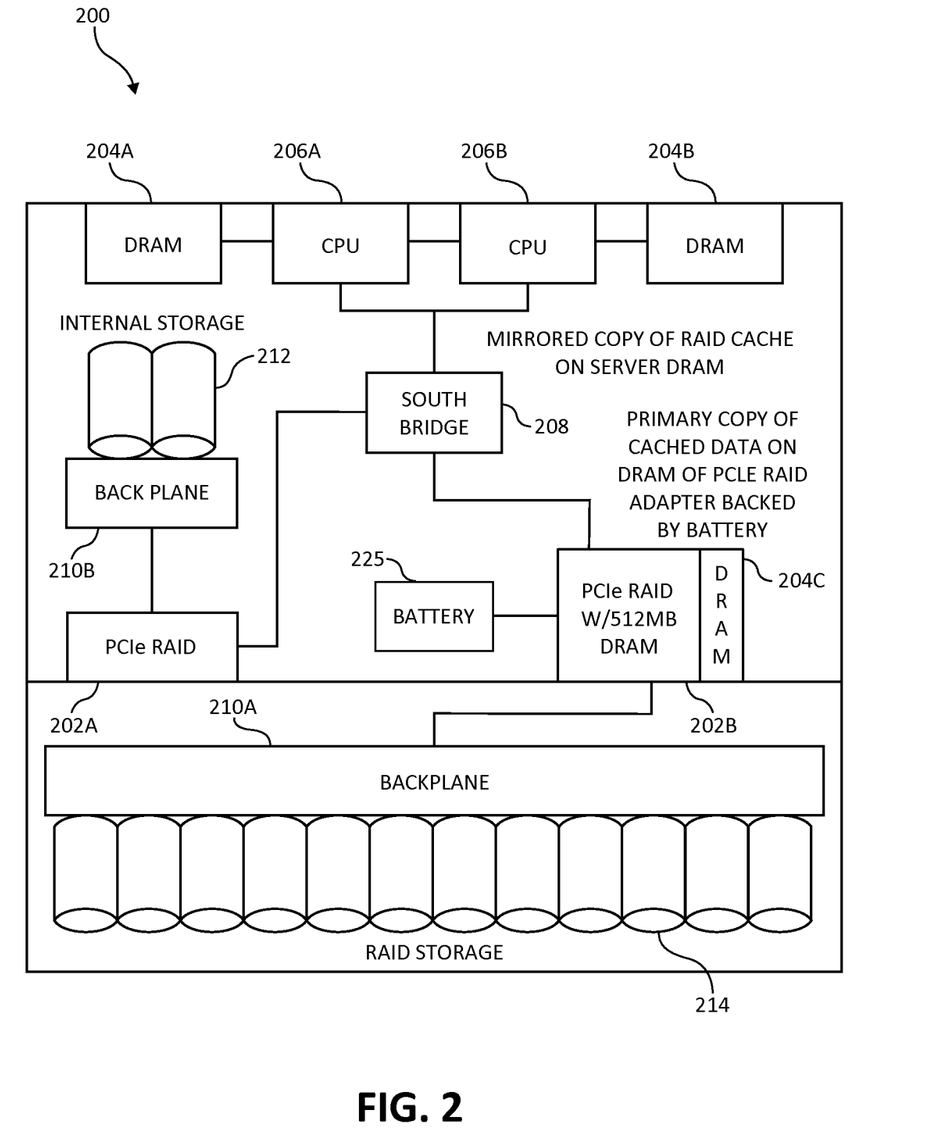
FIG. 2 is a block diagram illustrating a hardware structure of a computing system environment in which aspects of the present invention may be realized.

As will be described below, in one embodiment, server memory residing on the motherboard of the server hardware is allocated by an underlying driver such that it is identical size to that of the cache on the RAID card. When data is read/written to the storage managed by the RAID card, the contents of the cache on the RAID card are made consistent with the server memory. FIG. 2 illustrates the hardware layout with the copy of the RAID card cache residing on the server memory. Thus, the main runtime algorithm ensures that the RAID card cache content is consistent with the server memory duplicate copy of the cache content.

FIG. 2 is a block diagram illustrating a hardware structure 200 of a computing system environment in which aspects of the present invention may be realized. In one embodiment, FIG. 2 illustrates the hardware of IBM® ProtecTIER® deduplication system TS7610™ and/or TS7620™. In one embodiment, by way of example only, the present invention may be implemented as a programmable gate arrays (PGA) fix for the TS7610 and TS7620 ProtecTIER deduplication appliances. As observed in FIG. 2, in one embodiment, either a battery 225 is provided to provide sufficient charge on the NVRAM/RAID cache 202B content in the event of unexpected power loss for a finite period of time until power is resumed and the cached data can be committed to disk. Alternatively a super capacitor+flash/SSD device may be used where the capacitor provides enough charge to enable the cached data to be written to persistent flash storage. In one embodiment, internal storage 212 runs the ProtecTIER application code and OS instance. A RAID 1 mirror is created from the internal storage 212 using a PCIe RAID card 202A. A second RAID card 202B containing 512 MB battery backed dynamic random access memory (DRAM) is used for RAID cache. The second RAID card 202B creates RAID groups 214 and manages additional storage, which holds customer data. One or more CPUs 206 (shown in FIG. 2 as 206A and 206B) and associated server memory (204A and 204B) manage the system through a south bridge 208. In one embodiment, internal storage runs the ProtecTIER application code and OS instance. A RAID 1 mirror is created from the internal storage using a PCIe RAID card 202A. A second RAID card 202B containing battery backed dynamic random access memory (DRAM) (FIG. 2 illustrates at least two RAID cards 202A and 202B) is used for RAID cache. RAID card and it's associated DRAM 204C is used for RAID write cache memory. The second RAID card 202B creates RAID groups 214 via the backplane 210 (FIG. 2 illustrates at least two backplanes 210A and 210B) and manages additional storage, which holds customer data. One or more CPUs 206A and 206B and associated server memory manage the system 200 through a south bridge 208. In one embodiment, a mirrored copy of RAID cache is on a server DRAM 204A, 204B and a primary copy of cached data is on the DRAM 204C of a PCIe RAID adapter 202B backed by a battery 225.

Figure 3:
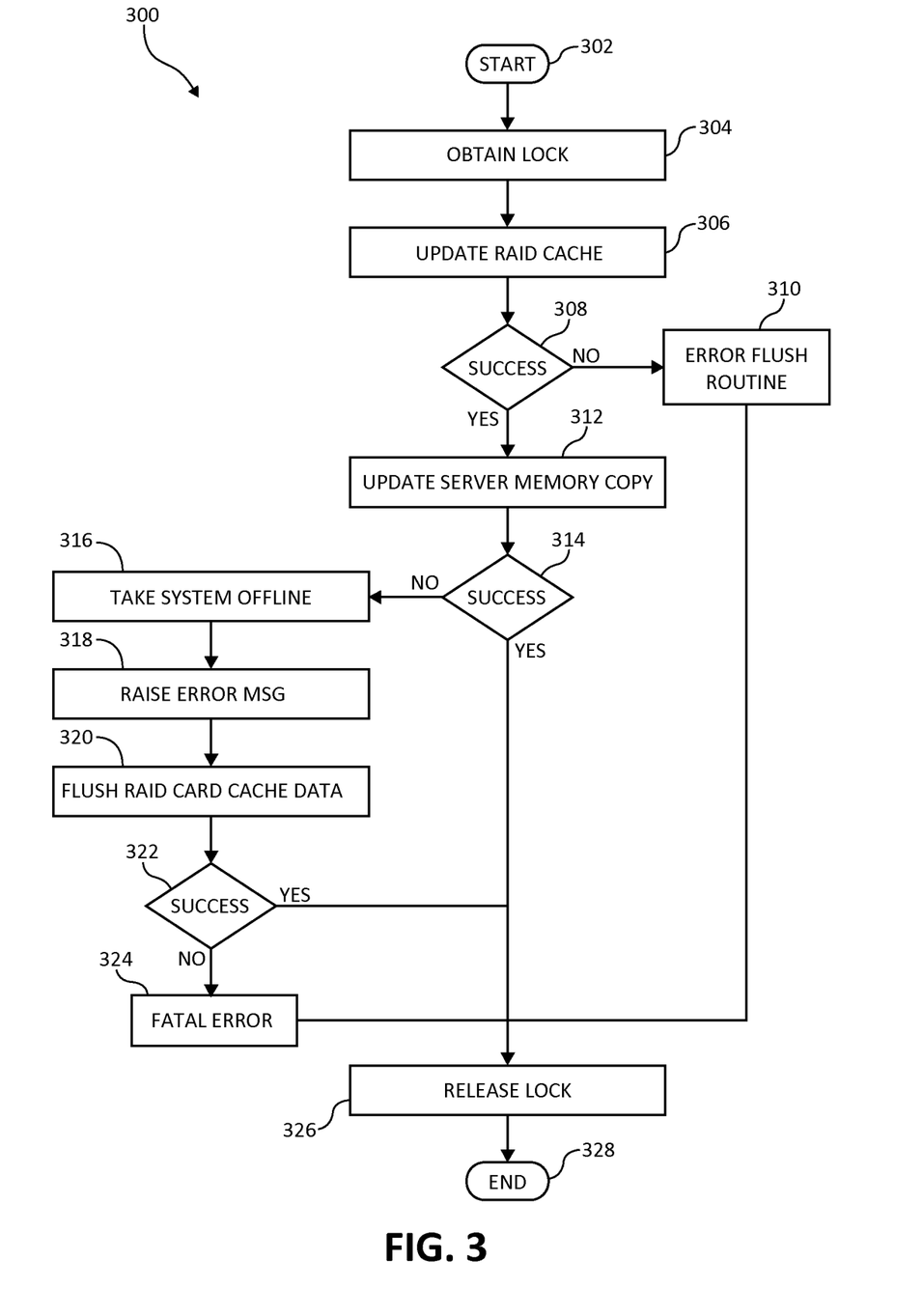
FIG. 3 is a flowchart illustrating an exemplary method for write cache protection of purpose built backup appliances in which aspects of the present invention may be realized.

FIG. 3 is a flowchart illustrating an exemplary method 300 for write cache protection of purpose built backup appliances in which aspects of the present invention may be realized. In one embodiment, the method 300 begins 302 and upon invocation, the method 300 obtains a lock (step 304) and updates the RAID card cache content (step 306). If step 306 is successful (step 308), the method 300 updates the server memory copy to be consistent with the RAID card cache content (step 312). If step 312 is successful (step 314), the method 300 releases the lock (step 326) and the method 300 ends such that success can be returned to the higher-level application (step 328).

If step 306 is unsuccessful (e.g., the update to the RAID cache fails) (step 308), the method 300 invokes an error flush routine (e.g., error flush routine operation), as described below in FIG. 4 (step 310). If step 312 is unsuccessful (e.g., the update to the server memory copy fails) (step 314), it means there is still a consistent copy in the cache on the RAID card but a server memory failure has been encountered. In this case the system is taken offline to prevent additional updates to the RAID cache (step 316) and server memory and an error is raised (step 318). Next the data on the RAID card cache is flushed to disk and the lock is released (step 320). The method 300 determines if flushing the RAID card cached data is successful (step 322). If flushing the RAID card cached data fails, a fatal error is raised (step 324), the lock is released (step 326), and the method 300 ends (step 328).

As described below in FIG. 4, the error flush routine ensures that the mirrored copy of the cache data residing on the server memory is flushed to persistent storage and is a complete and consistent copy. Upon invocation of the error flush routine, the system is taken offline. If the server memory is occupied with cached data the algorithm dumps the memory content to persistent storage, raises a notification indicating that cache data has been preserved, and sets a consistent copy flag. The consistent copy flag ensures that the full content of the server memory data has been committed to persistent disk as opposed to only a portion of it. If only a portion of the cache content was written to persistent storage, it could create a data corruption issue later on when the partial copy of the data is written to the storage managed by the RAID card. Such a condition could occur when: the RAID card fails with cache data on it and there is an unexpected power loss before the server memory content can be committed to disk. If an error is encountered when dumping the server memory content to persistent disk, a fatal error is raised and the algorithm ends.

Figure 4:
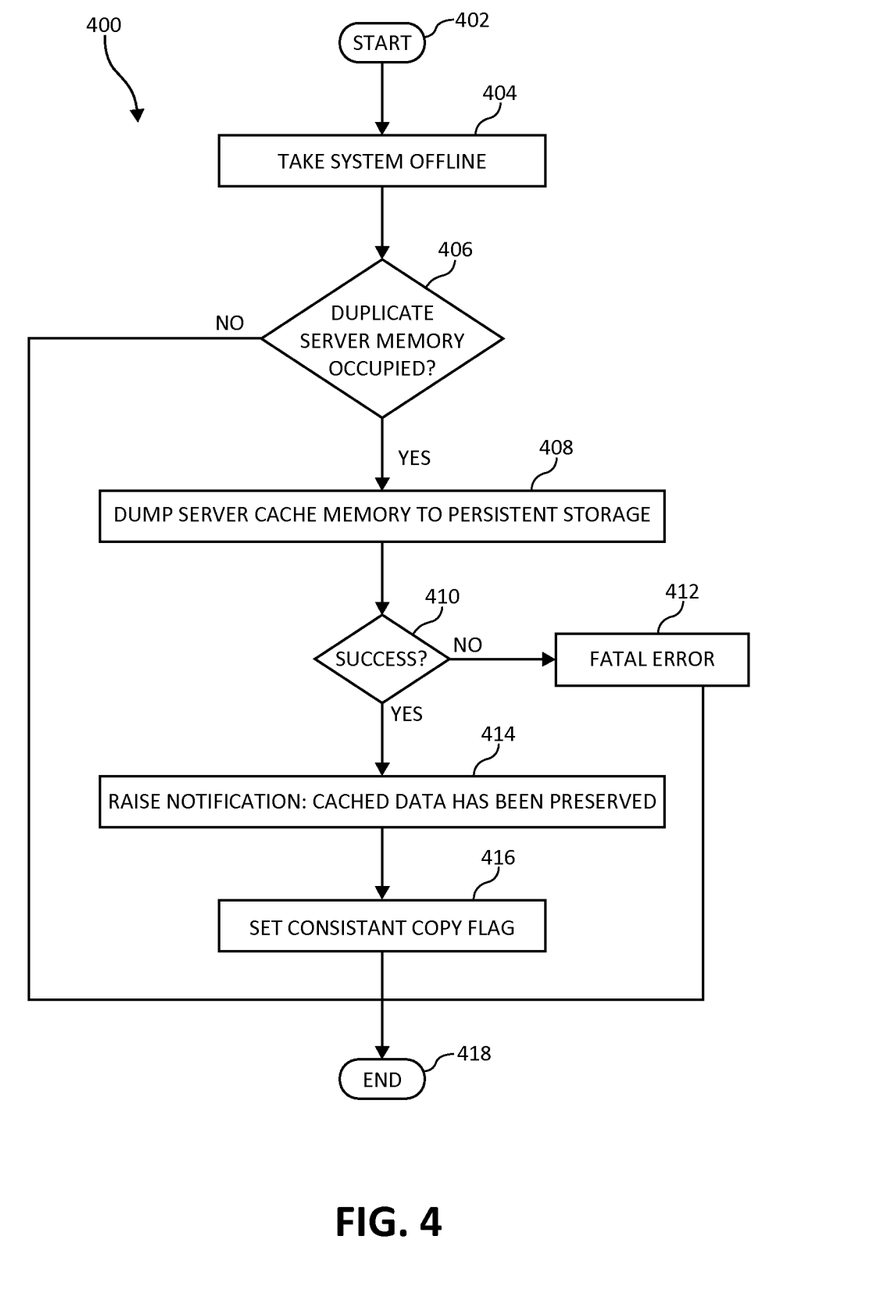
FIG. 4 is a flowchart illustrating an exemplary method for an error flush routine operation in which aspects of the present invention may be realized.

FIG. 4 is a flowchart illustrating an exemplary method 400 for an error flush routine operation in which aspects of the present invention may be realized. The method 400 begins (step 402) and upon invocation the method 400 takes the system offline (step 404). The method 400 determines if a duplicated server memory is occupied (step 406). If no, the method 400 ends (step 418). If yes, the method 400 dumps server cache memory to persistent storage (step 408). The method 400 determines if dumping (e.g. flushing) server cache memory to persistent storage was successful (step 410). If no, the method 400 encounters a fatal error when dumping the server memory content to persistent disk (step 412). If dumping (e.g. flushing) server cache memory to persistent storage was successful, the method 400 raises a notification that the cached data has been preserved (step 414). The method 400 sets a consistent copy flag (step 416) and the method 400 ends (step 418).

As described below, FIG. 4 illustrates the boot up routine that ensures that any cached data residing in either the persistent server storage or the RAID card memory is flushed to the RAID storage properly during boot up. In the case where the adapter fails, the persistent server memory copy is flushed to the RAID storage. In the case of unexpected power loss, the content of the cached memory on the RAID card can be flushed to the RAID storage. Upon starting the boot up routine checks for a dirty flag set on the persistent RAID card flash. If it is set, data is read from the RAID card cache memory and written to the RAID storage. After this completes, any data residing in the server memory is cleared and the consistent copy flag is cleared in the server memory if necessary. If reading of the data from cached memory fails or if writing the data to the RAID storage fails, the algorithm checks if the consistent copy flag is set on the storage. If the consistent copy flag is set on the storage, the persistent data restore algorithm is called. In the case where there is cache data on the RAID card that needs to be committed to disk, but a failure is encountered during this process, the algorithm can alternatively try to restore the data from the copy on the persistent server storage. On the other hand if the consistent copy flag is not set, the algorithm raises a fatal error and ends.

Figure 5:
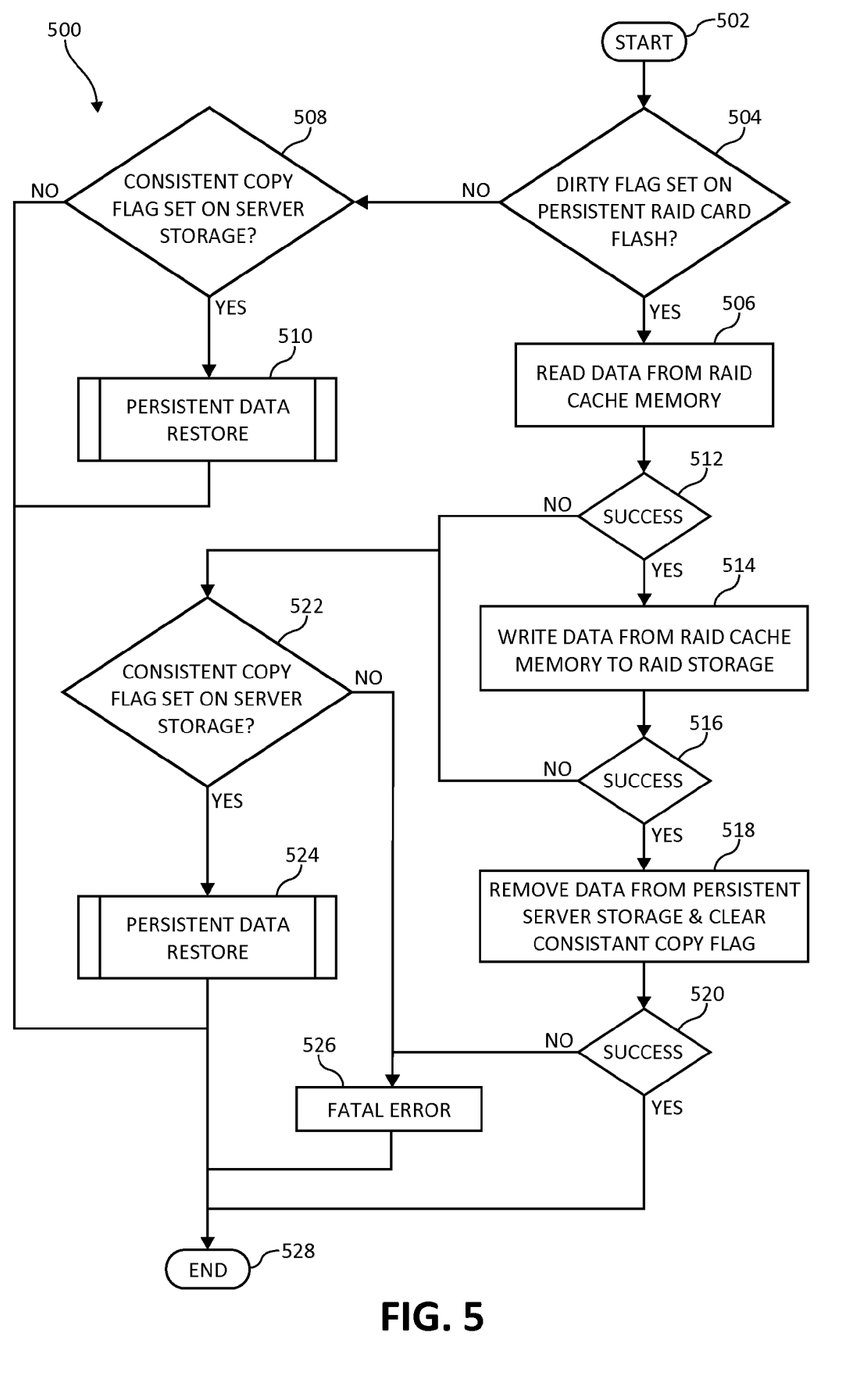
FIG. 5 is a flowchart illustrating an exemplary method for a boot up routine operation in which aspects of the present invention may be realized.

FIG. 5 is a flowchart illustrating an exemplary method 500 for a boot up routine operation in which aspects of the present invention may be realized. The method 500 begins (step 502) and determines if a dirty flag is set on a persistent RAID card flash (step 504). If yes, the method 500 reads data from RAID cache memory (step 506). If no, the method 500 determines if the consistent copy flag is set on a server storage (step 508). If the consistent copy flag is set on a server storage, the method 500 restores the persistent data (step 510) and the method 500 then ends (step 528). If the consistent copy flag is not set on a server storage, the method 500 ends (step 528).

Returning to step 506, the method 500 determines if the data is successfully read from RAID cache memory (step 512). If yes, the method 500 writes data from the RAID cache memory to RAID storage (step 514). If the data is unsuccessfully read from RAID cache memory, the method 500 determines if the consistent copy flag is set on the server storage (step 522). If yes, the method 500 restores the persistent data (step 524) and the method 500 then ends (step 528). If the consistent copy flag is not set on the server storage, the method 500 encounters a fatal error (step 526) and the method 500 ends (step 528).

Returning to step 514, the method 500 determines if the data is successfully written from the RAID cache memory to RAID storage (step 516). If the data is successfully written from the RAID cache memory to RAID storage, the method 500 removes data from the persistent server storage and/or clears the consistent copy flag (step 518). If the data is unsuccessfully written from the RAID cache memory to RAID storage, the method 500 returns to step 522 and the method 500 determines if the consistent copy flag is set on the server storage (step 522).

Returning to step 518, the method 500 determines if the data is successfully removed from the persistent server storage and/or clears the consistent copy flag (step 520). If yes, the method 500 ends (step 528). If no, the method 500 returns to step 526 and the method 500 encounters a fatal error (step 526) and the method 500 ends (step 528).

As described below in FIG. 6, an algorithm for restoring data from the persistent storage on the server to the storage managed by the RAID card is illustrated. In one embodiment, upon starting the algorithm disables write cache on the RAID card, reads the data from persistent server storage, writes it to the storage managed by the RAID card, and removes the data from the persistent server storage and clears the consistent copy flag, and re-enables write caching on the RAID card. If the algorithm fails to disable the RAID card write cache, read data from persistent server storage, write data to persistent server storage, or clear the data from the persistent storage (including the consistent copy flag), a fatal error is raised and the algorithm ends. If an error is encountered when enabling RAID card write cache, a error is raised and the algorithm ends. In one embodiment, a reliability, availability, and serviceability (RAS) module also monitors the RAID card for errors while the system is idle. if an error is detected during such a case, the error flush routine is invoked. Since the cache memory is empty, the cache flush routine returns without error (there is nothing to flush).

Figure 6:
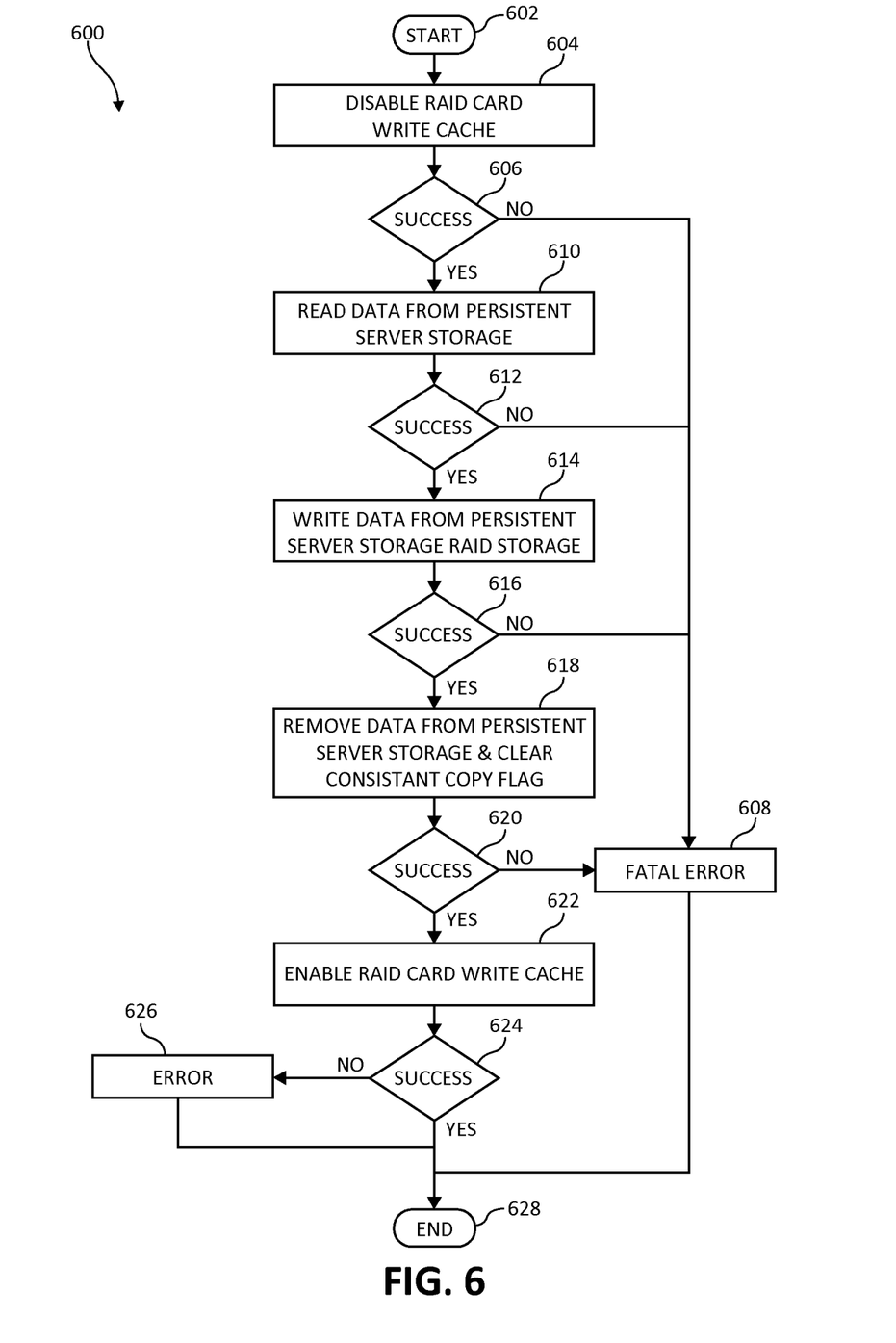
FIG. 6 is a flowchart illustrating an exemplary method for restoring data from a persistent server storage in which aspects of the present invention may be realized.

FIG. 6 is a flowchart illustrating an exemplary method 600 for restoring data from a persistent server storage in which aspects of the present invention may be realized. In one embodiment, by way of example only, the method 600 begins (step 602) and disables a RAID card write cache (step 604). The method 600 determines if the RAID card write cache was successfully disabled (step 606). If no, the method 600 encounters a fatal error (step 608) and the method 600 ends (step 628). If the RAID card write cache was successfully disabled, the method 600 reads data from persistent server storage (step 610). The method 600 determines if the data was successfully read from persistent server storage (step 612). If no, the method 600 encounters a fatal error (step 608) and the method 600 ends (step 628). If yes, the method 600 writes data from persistent server storage to RAID storage (step 614). The method 600 determines if the data is successful written from persistent server storage to RAID storage (step 616). If no, the method 600 encounters a fatal error (step 608) and the method 600 ends (step 628). If yes, the method 600 removes data from persistent server storage and clears a consistent copy flag (step 618). The method 600 determines if the data is successfully removed from persistent server storage and the consistent copy flag was cleared (step 620). If no, the method 600 encounters a fatal error (step 608) and the method 600 ends (step 628). If yes, the method 600 enables a RAID card write cache (step 622). The method 600 determines if the RAID card write cache was successfully enabled (step 624). If no, an error is encountered (step 626). If yes, the method 600 ends (step 628).

In an alternative embodiment the main runtime algorithm may utilize a customer configuration setting to allow the customer to define the desired behavior in case of failure to update server memory copy. As described herein, in one embodiment, by way of example only, the system will go offline, as data consistency cannot be ensured in case of subsequent RAID card failure. However, in an alternative embodiment, rather than taking a system offline, the present invention may provide a user provided option that may allow the system to continue to operate yet provide that customer with appropriate warning/alert indicating the reduced data protection. Such an alternative embodiment allows reducing immediate user impact with a tradeoff in terms of reliability.

In another alternative embodiment, in case an adapter hot swap of the RAID adapter card is supported, the boot up routine may restore the RAID cache backup data from server memory rather than the persistent copy in server storage while the data is still active in memory.

In yet another embodiment the system may perform a consistency check between active memory copy and system server copy in order to determine the best source for the required restore activity.

In one embodiment the system may utilize the server memory copy capability (e.g., a server memory copy infrastructure that could use a path that creates a copy of customer data on persistent storage) in order to continue limited operation even in case of RAID adapter failure or failure to access the RAID group. In such embodiment the limited local server disk space (mirrored DDM) could be utilized to allow currently running host jobs to complete by storing the data of the continuous data stream on the local disk drives rather than the intended RAID system. For example, such functionality may be limited by the number of supported parallel backup data streams and the max size of backup images versus the available space on the local mirrored disk drives. For example, 128 parallel data streams of 1 GB size would require 128 GB of free available space on the mirrored DDMs. On average the required space may be smaller than 128 GB, since not all possible data streams are active and only the data starting at error detection needs to be buffered, which could be anywhere between 1 byte into the data stream (requiring 1 GB-1 byte to be stored) to all the way up to the case where all data except for the last byte is already resident on RAID cache (requiring only 1 byte to be stored). Such functionality allows the storage appliance to gracefully fail by not accepting new host jobs yet allowing currently running jobs to complete as supposed to forcing the system offline immediately. Such operating mode with reduced availability may be reported appropriately to the user and/or provide the user provided option.

In one embodiment, the present invention provides a solution for write cache protection of purpose built backup appliances using at least one processor device in a computing environment. In one embodiment, by way of example only, backup data of the write cache is created using a server memory that includes the write cache in a redundant array of independent disks (RAID) system. The server memory is not controlled by a failing RAID card and/or NVRAM card that controls the write cache. In one embodiment, the RAID card is a hardware RAID card (e.g., a hardware RAID adapter that contains cache or other memory) and/or a software-based RAID card. The backup data in the server memory is flushed to a persistent storage device subsequent to detecting a failure of the write cache for enabling recovery of the backup data using the persistent storage device during a reboot operation. In one embodiment, a lock is obtained for maintaining consistency of the backup data between the write cache and the server memory. Upon obtaining the lock, the backup data on write cache and the server memory is updated for maintaining consistency of the backup data between the write cache and the server memory. The lock is released upon achieving a successful update of the backup data on the server memory.

In one embodiment, the present invention invokes an error flush operation if the backup data is unable to be successfully updated on the write cache, and/or takes the appliance offline if the backup data is unable to be successfully updated on the server memory.

In one embodiment, the present invention issues a fatal error message upon detecting a failure of flushing the backup data in the server memory to the persistent storage device, and/or ensures that a mirrored copy of the backup data residing on the server memory is flushed to the persistent storage device is a complete and consistent copy during the error flush operation.

In one embodiment, the present invention utilizes a user configuration setting for defining a desired behavior if the backup data is unable to be successfully updated on the server memory for allowing the purpose built backup appliance to continue to operate yet provide a user with a warning message indicating reduced data protection, restores the backup data via the reboot operation from the server memory rather than the backup copy in the persistent storage device while the backup data is still active in the server memory if the purpose built backup appliance supports an adapter hot swap of a RAID adapter card, performs a consistency check of the backup data between the write cache and the server memory in order to determine a best source for a required restore activity of the backup data, and/or utilizes limited local server disk space in order to continue limited operations if there is either a RAID adapter card failure or a failure to access the RAID system by using to allow currently running host jobs to complete rather than taking the purpose built backup appliance offline.

In one embodiment, by way of example only, the present invention is applied only to those systems that use a single, non-redundant RAID controller. The present invention may be limited to dynamic (volatile) memory on the second copy of backup data rather than the case of writing to 2 non-volatile independent memories (e.g., the more expensive dual controller configuration.)

In one embodiment, by way of example only, the present invention utilizes server memory, which is managed through an operating system to provide a secondary copy of the RAID card/NVRAM write cache content. Upon detecting failure, the present invention dumps the duplicate copy of the write cached data that is preserved in the server memory to local boot drives which are not managed by the same failed RAID card, which ensures a persistent copy of the write cached data. Once the NVRAM card or RAID card is replaced or fixed, read the persistent copy of the write cached data from the local boot drives and write it to the original persistent storage to which it was intended. In other words, the present invention introduces a redundant copy of cache data to main memory in order to overcome a shortcoming of single adapter RAID cards where RAID card failure can result in data loss. The present invention does not employ a special memory controller that contains smaller shadow dual in-line memory module (DIMMs) for write-cached data. In present invention, the DIMMs on the PCI-E RAID card are protected by a battery for power loss write cache data protection.

In one embodiment, the present invention protects against a single RAID adapter card failure where the present invention is able to preserve and recover write cached content despite the failure of the RAID card which is a single point of failure. In one embodiment, the present invention does this in an optimal, hardware platform and cost efficient manner and does not require introducing multiple controllers nor does it require introducing a shared write cache memory pool, such as keeping a shared write cache memory pool between multiple controllers and using smaller DIMMs in a main server memory in order to enable a reasonable size battery to protect the smaller DIMMs in case of power loss.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (e.g., a non-transitory computer readable storage medium). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method for write cache protection in a purpose built backup appliance using a processor device in a computing environment, the method comprising:
   upon data of the write cache being written to storage that is managed by a redundant array of independent disks (RAID) card, creating backup data of the write cache and preserving the backup data in a server memory that is managed through an operating system and not controlled by the RAID card;
   flushing the backup data in the server memory to a persistent storage device subsequent to detecting a failure of the RAID card; and, performing a reboot operation and, during the reboot operation, restoring the backup data to the storage managed by the RAID card from either the server memory or the persistent storage device, the purpose built backup appliance supporting an adapter hot swap of a RAID adapter card and the backup data being restored during the reboot operation from the server memory and not from the persistent storage device when the backup data is still active in the server memory.

2. The method of claim 1, further including obtaining a lock for maintaining consistency of the backup data on the server memory, wherein the RAID card is at least one of a hardware RAID card, a software-based RAID card.

3. The method of claim 2, further including, upon obtaining the lock, updating the backup data on the server memory for maintaining consistency of the backup data between the write cache and the server memory.

4. The method of claim 3, further including releasing the lock upon achieving a successful update of the backup data on the server memory.

5. The method of claim 3, further including performing one of:
invoking an error flush operation if the backup data is unable to be successfully updated, and
taking the purpose built backup appliance offline if the backup data is unable to be successfully updated on the server memory.

6. The method of claim 5, further including performing one of:
issuing a fatal error message upon detecting a failure of flushing the backup data in the server memory to the persistent storage device, and
ensuring that a mirrored copy of the backup data residing on the server memory is flushed to the persistent storage device is a complete and consistent copy during the error flush operation.

7. The method of claim 1, further including performing one of:
utilizing a user configuration setting for defining a desired behavior if the backup data is unable to be successfully updated on the server memory for allowing the purpose built backup appliance to continue to operate yet provide a user with a warning message indicating reduced data protection,
performing a consistency check of the backup data on the server memory in order to determine a best source for a required restore activity of the backup data, and
utilizing limited local server disk space in order to continue limited operations if there is one of a RAID adapter card failure and failure to access a RAID system by allowing currently running host jobs to complete rather than taking the purpose built backup appliance offline.

8. A system for write cache protection in a purpose built backup appliance of a computing storage environment, the system comprising:
at least one processor device operable in the computing storage environment for controlling the purpose built backup appliance,
wherein, upon data of the write cache being written to storage that is managed by a redundant array of independent disks (RAID) card, the at least one processor device creates backup data of the write cache and preserves the backup data in a server memory that is managed through an operating system and not controlled by the RAID card,
wherein the at least one processor flushes the backup data in the server memory to a persistent storage device subsequent to detecting a failure of the RAID card, and
wherein the at least one processes performs a reboot operation and, during the reboot operation, restores the backup data to the storage managed by the RAID card from either the server memory or the persistent storage device, the purpose built backup appliance supporting an adapter hot swap of a RAID adapter card and the backup data being restored during the reboot operation from the server memory and not from the persistent storage device when the backup data is still active in the server memory.

9. The system of claim 8, wherein the at least one processor device obtains a lock for maintaining consistency of the backup data on the server memory, wherein the RAID card is at least one of a hardware RAID card, a software-based RAID card.

10. The system of claim 9, wherein the at least one processor device, upon obtaining the lock, updates the backup data on the server memory for maintaining consistency of the backup data between the write cache and the server memory.

11. The system of claim 10, wherein the at least one processor device releases the lock upon achieving a successful update of the backup data on the server memory.

12. The system of claim 10, wherein the at least one processor device performs one of:
invoking an error flush operation if the backup data is unable to be successfully updated, and
taking the purpose built backup appliance offline if the backup data is unable to be successfully updated on the server memory.

13. The system of claim 12, wherein the at least one processor device performs one of:
issuing a fatal error message upon detecting a failure of flushing the backup data in the server memory to the persistent storage device, and
ensuring that a mirrored copy of the backup data residing on the server memory is flushed to the persistent storage device is a complete and consistent copy during the error flush operation.

14. The system of claim 8, wherein the at least one processor device performs one of:
utilizing a user configuration setting for defining a desired behavior if the backup data is unable to be successfully updated on the server memory for allowing the purpose built backup appliance system to continue to operate yet provide a user with a warning message indicating reduced data protection,
performing a consistency check of the backup data on the server memory in order to determine a best source for a required restore activity of the backup data, and
utilizing limited local server disk space in order to continue limited operations if there is one of a RAID adapter card failure and failure to access a RAID system by allowing currently running host jobs to complete rather than taking the purpose built backup appliance offline.

15. A computer program product for applying a content defined minimum size bound on content defined blocks using a processor device in a computing environment for write cache protection in a purpose built backup appliance, the computer program product comprising a non-transitory computer-readable storage medium having computer-readable program code portions stored therein, the computer-readable program code portions comprising:

a first executable portion that, upon data of the write cache being written to storage that is managed by a redundant array of independent disks (RAID) card, creates backup data of the write cache using a server memory that is managed through an operating system and not controlled by the RAID card;

a second executable portion that flushes the backup data in the server memory to a persistent storage device subsequent to detecting a failure of the RAID card; and a third executable portion that, during a reboot operation, restores the backup data to the storage managed by the RAID card from either the server memory or the persistent storage device, the purpose built backup appliance supporting an adapter hot swap of a RAID adapter card and the backup data being restored during the reboot operation from the server memory and not from the persistent storage device when the backup data is still active in the server memory.

16. The computer program product of claim 15, further including a fourth executable portion that obtains a lock for maintaining consistency of the backup data on the server memory, wherein the RAID card is at least one of a hardware RAID card, a software-based RAID card.

17. The computer program product of claim 16, further including a fifth executable portion that, upon obtaining the lock, updates the backup data on the server memory for maintaining consistency of the backup data between the write cache and the server memory.

18. The computer program product of claim 17, further including a sixth executable portion that performs one of:

releasing the lock upon achieving a successful update of the backup data on the server memory, and invoking an error flush operation if the backup data is unable to be successfully updated.

19. The computer program product of claim 18, further including a seventh executable portion that performs one of:

issuing a fatal error message upon detecting a failure of flushing the backup data in the server memory to the persistent storage device, and ensuring that a mirrored copy of the backup data residing on the server memory is flushed to the persistent storage device is a complete and consistent copy during the error flush operation.

20. The computer program product of claim 15, further including a fourth executable portion that performs one of:

utilizing a user configuration setting for defining a desired behavior if the backup data is unable to be successfully updated on the server memory for allowing a purpose built backup appliance to continue to operate yet provide a user with a warning message indicating reduced data protection, performing a consistency check of the backup data on the server memory in order to determine a best source for a required restore activity of the backup data, and utilizing limited local server disk space in order to continue limited operations if there is one of a RAID adapter card failure and failure to access a RAID system by allowing currently running host jobs to complete rather than taking the purpose built backup appliance offline.

\* \* \* \* \*